US011405783B2

(12) United States Patent
Chen et al.

(10) Patent No.: US 11,405,783 B2
(45) Date of Patent: Aug. 2, 2022

(54) ACCESS CONTROL METHOD AND DEVICE

(71) Applicant: China Academy of Telecommunications Technology, Beijing (CN)

(72) Inventors: Shanzhi Chen, Beijing (CN); Zhonglin Chen, Beijing (CN); Ming Ai, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 280 days.

(21) Appl. No.: 16/472,728

(22) PCT Filed: Aug. 29, 2017

(86) PCT No.: PCT/CN2017/099523
§ 371 (c)(1),
(2) Date: Jun. 21, 2019

(87) PCT Pub. No.: WO2018/113338
PCT Pub. Date: Jun. 28, 2018

(65) Prior Publication Data
US 2020/0196150 A1 Jun. 18, 2020

(30) Foreign Application Priority Data

Dec. 21, 2016 (CN) .......................... 201611193853.7

(51) Int. Cl.
*G06F 7/04* (2006.01)
*H04W 12/069* (2021.01)
(Continued)

(52) U.S. Cl.
CPC ....... *H04W 12/069* (2021.01); *H04L 63/0869* (2013.01); *H04L 63/0876* (2013.01);
(Continued)

(58) Field of Classification Search
CPC . H04L 63/164; H04L 63/065; H04L 63/0892; H04L 9/3271; H04L 9/3273;
(Continued)

(56) References Cited

U.S. PATENT DOCUMENTS

2006/0079205 A1* 4/2006 Semple ............... H04W 12/108
455/411
2006/0128362 A1* 6/2006 Bae ................... H04W 12/0431
455/411
(Continued)

FOREIGN PATENT DOCUMENTS

CN 102625307 A 8/2012
CN 104852896 A 8/2015
(Continued)

OTHER PUBLICATIONS

Wilson, The Network Security Architecture and Possible Safety Benefits of the AeroMacs Network, IEEE, May 12, 2011, p. 1-9. (Year: 2011).*

(Continued)

*Primary Examiner* — Luu T Pham
*Assistant Examiner* — Jenise E Jackson
(74) *Attorney, Agent, or Firm* — Foley & Lardner LLP

(57) ABSTRACT

Embodiments of the present invention relate to the technical field of wireless communications, and in particular to an access control method and device, for use in resolving the problem in the prior art that a user equipment cannot securely access an access points group (APG). According to the embodiments of the present invention, when a user equipment needs to access a network, the user equipment conducts network-layer two-way authentication with a local service center; after the network-layer two-way authentication succeeds, the user equipment conducts access-layer two-way authentication with a corresponding APG so as to
(Continued)

enable the user equipment to access the corresponding APG after the access-layer two-way authentication succeeds. The embodiments of the present invention use dual-layer two-way authentication, and enables the user equipment to access a corresponding APG after the dual-layer two-way authentication succeeds, so that the user equipment can securely access the corresponding APG.

10 Claims, 9 Drawing Sheets

(51) Int. Cl.
*H04W 12/08* (2021.01)
*H04L 9/40* (2022.01)
*H04W 12/06* (2021.01)
*H04W 48/20* (2009.01)
*H04W 12/71* (2021.01)

(52) U.S. Cl.
CPC ........... *H04W 12/06* (2013.01); *H04W 12/08* (2013.01); *H04W 12/71* (2021.01); *H04W 48/20* (2013.01)

(58) Field of Classification Search
CPC ....... H04L 9/08; H04L 9/0816; H04L 9/0819; H04L 9/0838; H04L 9/085; H04L 63/0869; H04L 63/0876; G06F 21/43; G06F 21/44; G06F 21/445; H04W 12/041; H04W 12/0431; H04W 12/0471; H04W 12/069; H04W 12/071; H04W 12/06; H04W 12/08; H04W 48/20
See application file for complete search history.

(56) References Cited

U.S. PATENT DOCUMENTS

| | | | |
|---|---|---|---|
| 2008/0254833 A1* | 10/2008 | Keevill | H04W 24/02 455/558 |
| 2008/0273704 A1* | 11/2008 | Norrman | H04L 63/062 380/278 |
| 2013/0007858 A1 | 1/2013 | Shah et al. | |
| 2013/0298209 A1* | 11/2013 | Targali | H04W 12/06 726/6 |
| 2016/0205550 A1 | 7/2016 | Rajadurai | |
| 2016/0309384 A1 | 10/2016 | Zhang et al. | |
| 2017/0078874 A1* | 3/2017 | Lee | H04W 12/037 |
| 2017/0223531 A1* | 8/2017 | Mestanov | H04L 9/0844 |
| 2017/0243417 A1* | 8/2017 | Manikantan Shila | B66B 1/468 |

FOREIGN PATENT DOCUMENTS

| | | |
|---|---|---|
| CN | 105245338 A | 1/2016 |
| CN | 105451250 A | 3/2016 |
| CN | 105516961 A | 4/2016 |
| KR | 20140111513 A | 9/2014 |

OTHER PUBLICATIONS

L.T. Jung, EAP-based Authentication with EAP Method Selection Mechanism: Simulation Design, IEEE, Dec. 12, 2007, pp. 1-4. (Year: 2007).*

Shanzhi Chen, et. al.; "User-Centric Ultra Dense Networks for 5G: Challenges, Methodologies, and Directions"; IEEE Wireless Communications; Apr. 2016.

* cited by examiner

ACCESS CONTROL METHOD AND DEVICE

This application is a U.S. National Stage of International Application No. PCT/CN2017/099523, filed Aug. 29, 2017, which claims priority to Chinese Patent Application No. 201611193853.7, filed Dec. 21, 2016, both of which are hereby incorporated by reference in their entireties.

FIELD

The present invention relates to the field of wireless communications, and particularly to a method and device for access control.

BACKGROUND

In the future network, a traditional macro base station with high power, and a large number of deployed base stations with low power constitute an Ultra-Dense Network (UDN), and this is a very promising option for satisfying the demand for a data rate of future wireless mobile communication.

In an UDN scenario, the density of a huge number of Access Points (APs) may even be equivalent to that of their users. In order to further improve a user experience, a User-centric Ultra-Dense Network (UUDN) solution has been proposed. In a UUDN scenario, a dynamically varying Access Points Group (APG) will be organized to serve moving users without being perceived, that is, there will be an AGP corresponding to each user equipment in the UDN or UUDN scenario.

In the existing mobile communication system access network, such as the Evolved Universal Terrestrial Radio Access Network (E-UTRAN), APs are deployed and maintained in a safe and trusted environment by operators. To access the E-UTRAN, a User Equipment (UE) performs mutual authentication with a Mobility Management Entity (MME), and if the authentication succeeds, the UE accesses an evolved Node B (eNB) or Home eNB (HeNB) directly. However, in the UDN or UUDN scenario, APs have diverse functions and flexible deployment modes (even user-deployed), and physical security environments of different access networks are complex and different. Since the members of an APG providing service to a UE are changing dynamically, and one AP might belong to multiple APGs, the existing access control method for UE cannot be exempt from security attacks performed by an illegal AP pretending to be a member of a legal APG and thus cannot ensure access security of UE. Apparently, the existing method for UE to access an eNB or HeNB directly does not suitable for the UDN or UUDN scenario.

In summary, there has been absent so far a method for accessing an APG by a UE in the UDN or UUDN scenario.

SUMMARY

Embodiments of the invention provide an access control method and device to solve the problem in the related art that UE cannot access an APG in a UDN/UUDN scenario safely.

In a first aspect, an embodiment of the invention provides a method for access control. The method includes: performing, by a User Equipment (UE), network layer mutual authentication with a local service center (LSC) when the UE needs to access a network; and performing, by the UE, access layer mutual authentication with a corresponding Access points group (APG) after the network layer mutual authentication is passed, so that the UE accesses the APG after the access layer mutual authentication is passed.

Optionally, performing, by the UE, access layer mutual authentication with the corresponding APG, includes: authenticating, by the UE, the network according to an access layer authentication request message including an APG identifier and transmitted by a target AP in the APG; and transmitting, by the UE, an access layer authentication request response message including the APG identifier to the target AP after the authentication of the network is passed, so that the target AP authenticates the UE according to the access layer authentication request response message.

Optionally, authenticating, by the UE, the network according to the access layer authentication request message including the APG identifier and transmitted by the target AP in the APG, includes: determining, by the UE, a second authentication token according to a random number in the access layer authentication request message; and determining, by the UE, that the authentication of the network is passed if the second authentication token and a first authentication token in the access layer authentication request message are the same.

Optionally, transmitting, by the UE, the access layer authentication request response message including the APG identifier to the target AP after the authentication of the network is passed, includes: determining, by the UE, an authentication response parameter according to the random number after the authentication of the network is passed; and transmitting, by the UE, the access layer authentication request response message including the APG identifier and the authentication response parameter to the target AP, so that the target AP authenticates the UE according to the APG identifier and the authentication response parameter.

In a second aspect, an embodiment of the invention provides a method for access control. The method includes: performing, by an LSC, network layer mutual authentication with a UE after receiving an access request message from the UE; determining, by the LSC, an APG corresponding to the UE after determining that the network layer mutual authentication with the UE is passed; and instructing, by the LSC, the APG to perform access layer mutual authentication with the UE, so that the APG allows the UE to access the APG after the access layer mutual authentication is passed.

Optionally, after receiving, by the LSC, the access request message from the UE and before performing, by the LSC, network layer mutual authentication with the UE, the method further includes: requesting, by the LSC, a network layer authentication parameter corresponding to the UE from a network service center, according to context information of the UE in the access request message. Performing, by the LSC, network layer mutual authentication with the UE includes: performing, by the LSC, network layer mutual authentication with the UE according to the network layer authentication parameter.

Optionally, performing, by the LSC, network layer mutual authentication with the UE according to the network layer authentication parameter, includes: transmitting, by the LSC, a network layer authentication request message including the network layer authentication parameter to the UE, so that the UE authenticates a network according to the network layer authentication request message; and authenticating, by the LSC, the UE according to a network layer authentication request response message if the LSC receives the network layer authentication request response message transmitted by the UE.

Optionally, authenticating, by the LSC, the UE according to the network layer authentication request response message transmitted by the UE, includes: determining, by the LSC, that the authentication of the UE is passed if an authentication response parameter included in the network layer authentication request response message and an expected response parameter in the network layer authentication parameter are the same.

Optionally, instructing, by the LSC, the APG to perform access layer mutual authentication with the UE, includes: determining, by the LSC, a target AP in the APG; and instructing, by the LSC, the target AP to perform access layer mutual authentication with the UE.

Optionally, instructing, by the LSC, the target AP to perform access layer mutual authentication with the UE, includes: transmitting, by the LSC, to the target AP an APG identifier corresponding to the APG and an access layer authentication parameter corresponding to the UE, so that the target AP performs access layer mutual authentication with the UE according to the APG identifier and the access layer authentication parameter.

Optionally, the LSC determines the access layer authentication parameter corresponding to the UE by: obtaining the access layer authentication parameter corresponding to the UE from a network service center; or, determining the access layer authentication parameter corresponding to the UE, according to the network layer authentication parameter corresponding to the UE and the APG identifier.

In a third aspect, an embodiment of the invention provides a method for access control. The method includes: receiving, by an AP, from an LSC an access layer authentication parameter corresponding to a UE, where the access layer authentication parameter is transmitted by the LSC after the LSC determines that network layer mutual authentication with the UE is passed; and performing, by the AP, access layer mutual authentication with the UE, and allowing the UE to access the AP after determining that the access layer mutual authentication with the UE is passed.

Optionally, performing, by the AP, access layer mutual authentication with the UE corresponding to the access layer authentication parameter, includes: transmitting, by the AP, an access layer authentication request message including both an APG identifier and the access layer authentication parameter to the UE, so that the UE authenticates a network according to the access layer authentication request message; and authenticating, by the AP, the UE according to an access layer authentication request response message if the AP receives from the UE the access layer authentication request response message including the APG identifier.

Optionally, authenticating, by the AP, the UE according to the access layer authentication request response message including the APG identifier and transmitted by the UE, includes: determining, by the AP, that the authentication of the UE is passed if an authentication response parameter included in the access layer authentication request response message and an expected response parameter in the access layer authentication parameter are the same.

In a fourth aspect, an embodiment of the invention provides a UE. The UE includes: a first network authentication module, configured to perform network layer mutual authentication with an LSC when the UE needs to access a network; and a first access authentication module, configured to perform access layer mutual authentication with a corresponding APG after the network layer mutual authentication is passed, so that the UE accesses the APG after the access layer mutual authentication is passed.

Optionally, the first access authentication module is further configured to: authenticate the network according to an access layer authentication request message including an APG identifier and transmitted by a target access point AP in the APG; and transmit an access layer authentication request response message including the APG identifier to the target AP after the authentication of the network is passed, so that the target AP authenticates the UE according to the access layer authentication request response message.

Optionally, the first access authentication module is further configured to: determine a second authentication token according to a random number in the access layer authentication request message; and determine that the authentication of the network is passed if the second authentication token and a first authentication token in the access layer authentication request message are the same.

Optionally, the first access authentication module is further configured to: determine an authentication response parameter according to the random number after the authentication of the network is passed; and transmit the access layer authentication request response message including the APG identifier and the authentication response parameter to the target AP, so that the target AP authenticates the UE according to the APG identifier and the authentication response parameter.

In a fifth aspect, an embodiment of the invention provides an LSC. The LSC includes: a second network authentication module, configured to perform network layer mutual authentication with a UE after receiving an access request message from the UE; an instructing module, configured to determine an APG corresponding to the UE after determining that the network layer mutual authentication with the UE is passed; and a second access authentication module, configured to instruct the APG to perform access layer mutual authentication with the UE, so that the APG allows the UE to access the APG after the access layer mutual authentication is passed.

Optionally, the second network authentication module is further configured to: request a network layer authentication parameter corresponding to the UE from a network service center, according to context information of the UE in the access request message, after receiving the access request message from the UE and before performing network layer mutual authentication with the UE. The second network authentication module is further configured to perform network layer mutual authentication with the UE according to the network layer authentication parameter.

Optionally, the second network authentication module is further configured to: transmit a network layer authentication request message including the network layer authentication parameter to the UE, so that the UE authenticates a network according to the network layer authentication request message; and authenticate the UE according to a network layer authentication request response message when the network layer authentication request response message transmitted by the UE is received.

Optionally, the second network authentication module is further configured to: determine that the authentication of the UE is passed if an authentication response parameter included in the network layer authentication request response message and an expected response parameter in the network layer authentication parameter are the same.

Optionally, the second access authentication module is further configured to: determine a target AP in the APG; and instruct the target AP to perform access layer mutual authentication with the UE.

Optionally, the second access authentication module is further configured to: transmit to the target AP an APG identifier corresponding to the APG and an access layer authentication parameter corresponding to the UE, so that the target AP performs access layer mutual authentication with the UE according to the APG identifier and the access layer authentication parameter.

Optionally, the second access authentication module is further configured to determine the access layer authentication parameter corresponding to the UE by: obtaining the access layer authentication parameter corresponding to the UE from a network service center; or, determining the access layer authentication parameter corresponding to the UE, according to the network layer authentication parameter corresponding to the UE and the APG identifier.

In a sixth aspect, an embodiment of the invention provides an AP. The AP includes: a receiving module, configured to receive from an LSC an access layer authentication parameter corresponding to a UE, where the access layer authentication parameter is transmitted by the LSC after the LSC determines that network layer mutual authentication with the UE is passed; and a third access authentication module, configured to perform access layer mutual authentication with the UE, and to allow the UE to access the AP after determining that the access layer mutual authentication with the UE is passed.

Optionally, the third access authentication module is further configured to: transmit an access layer authentication request message including both an APG identifier and the access layer authentication parameter to the UE, so that the UE authenticates a network according to the access layer authentication request message; and authenticate the UE according to an access layer authentication request response message if the access layer authentication request response message including the APG identifier is received from the UE.

Optionally, the third access authentication module is further configured to determine that the authentication of the UE is passed if an authentication response parameter included in the access layer authentication request response message and an expected response parameter in the access layer authentication parameter are the same.

An embodiment of the invention provides another UE. The UE includes a memory and a processor. The processor is configured to read a program in the memory to: perform network layer mutual authentication with an LSC when the UE needs to access a network; and perform access layer mutual authentication with a corresponding APG after the network layer mutual authentication is passed, so that the UE accesses the APG after the access layer mutual authentication is passed.

An embodiment of the invention provides another LSC. The LSC includes a memory and a processor. The processor is configured to read a program in the memory to: perform network layer mutual authentication with a UE after receiving an access request message from the UE; determine an APG corresponding to the UE after determining that the network layer mutual authentication with the UE is passed; and instruct the APG to perform access layer mutual authentication with the UE, so that the APG allows the UE to access the APG after the access layer mutual authentication is passed.

An embodiment of the invention provides another AP. The AP includes a memory and a processor. The processor is configured to read a program in the memory to: receive from an LSC an access layer authentication parameter corresponding to a UE, where the access layer authentication parameter is transmitted by the LSC after the LSC determines that network layer mutual authentication with the UE is passed; and perform access layer mutual authentication with the UE, and allow the UE to access the AP after determining that the access layer mutual authentication with the UE is passed.

In the embodiments of the invention, when the UE needs to access the network, it performs network layer mutual authentication with the LSC first, and after the network layer mutual authentication is passed, it performs access layer mutual authentication with the target AP in the corresponding APG. Since mutual authentication at two layers is performed, and the UE can access the corresponding APG after the mutual authentication at two layers succeeds, the UE can access the corresponding APG safely.

DETAILED DESCRIPTION OF THE EMBODIMENTS

In order to make the objects, technical solutions, and advantages of the embodiments of the invention more apparent, the technical solutions according to the embodiments of the invention are described below in detail with reference to the drawings in the embodiments of the invention. Apparently the embodiments to be described are only a part but not all of the embodiments of the invention. Based upon the embodiments described herein, all other embodiments which can occur to those ordinarily skilled in the art without any inventive effort shall fall into the scope of the invention.

Firstly, an implementation environment of technical schemes provided by the embodiments of the invention is illustrated below.

Figure 1:
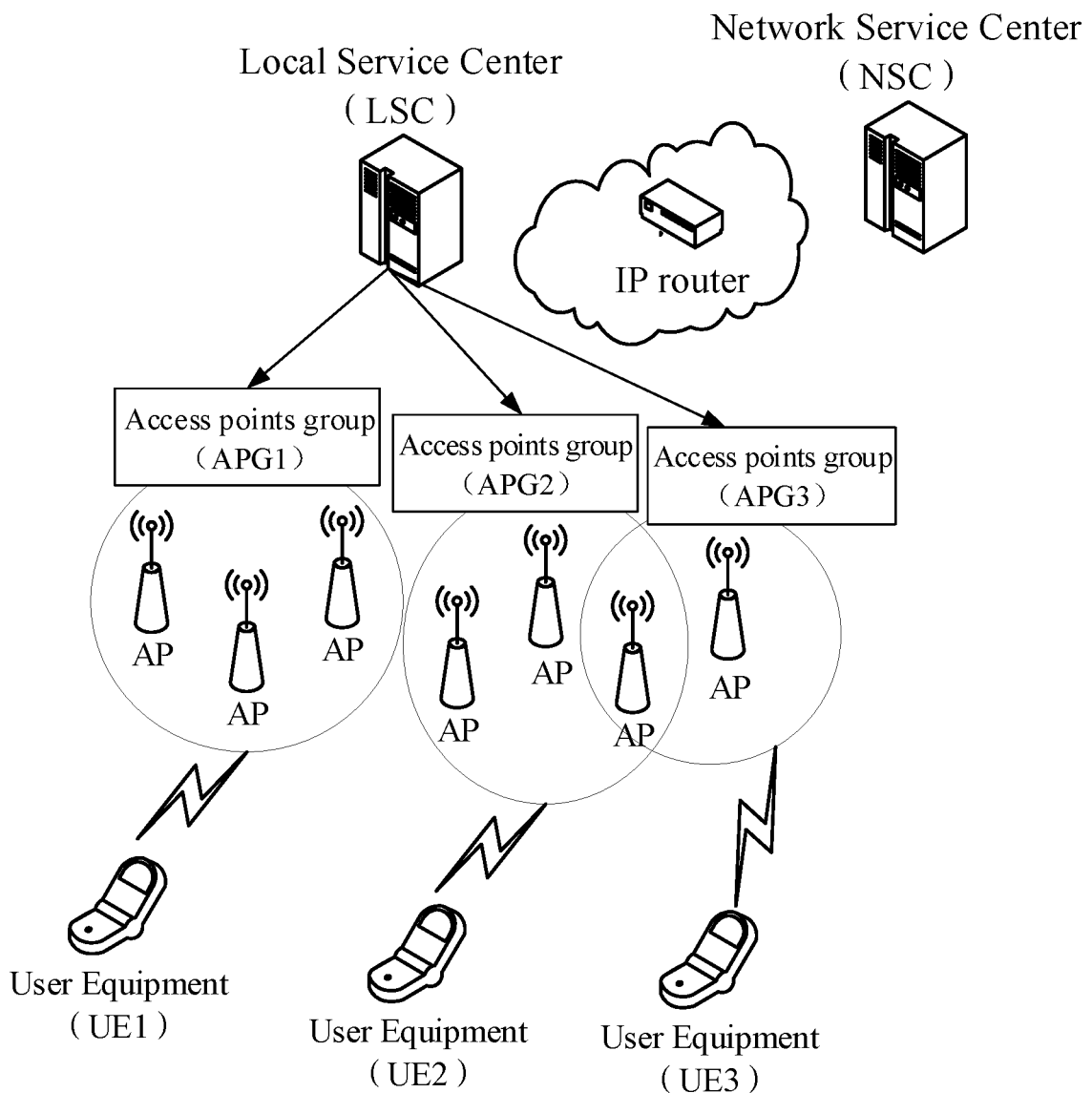
FIG. 1 is a schematic structural diagram of a UDN according to an embodiment of the invention.

FIG. 1 is a schematic structural diagram of a UDN. As illustrated in FIG. 1, the network structure includes a Network Service Center (NSC), a Local Service Center (LSC), multiple UE, and multiple APGs providing services to the UE. Each of the multiple APGs includes multiple APs, where one AP can belong to different APGs, each APG corresponds to an APG identifier (ID), and each APG corresponds to one UE. APs of each APG connect to a UE wirelessly. Each AP connects to the LSC through a wired connection way, and the LSC and the NSC are connected via an Internet Protocol (IP) network.

In the description below, implementation through cooperation between a network side device and the UE is illustrated first, and then implementation at the network side and at the UE side is illustrated, respectively. This doesn't mean that the illustrated implementation at the network side and at the UE side must be performed together. In fact, when the illustrated implementation at the network side and at the UE side is performed separately, problems existing on the network side and at the UE side are solved, respectively. But when such implementations are performed together, a better technical effect can be achieved.

Figure 2:
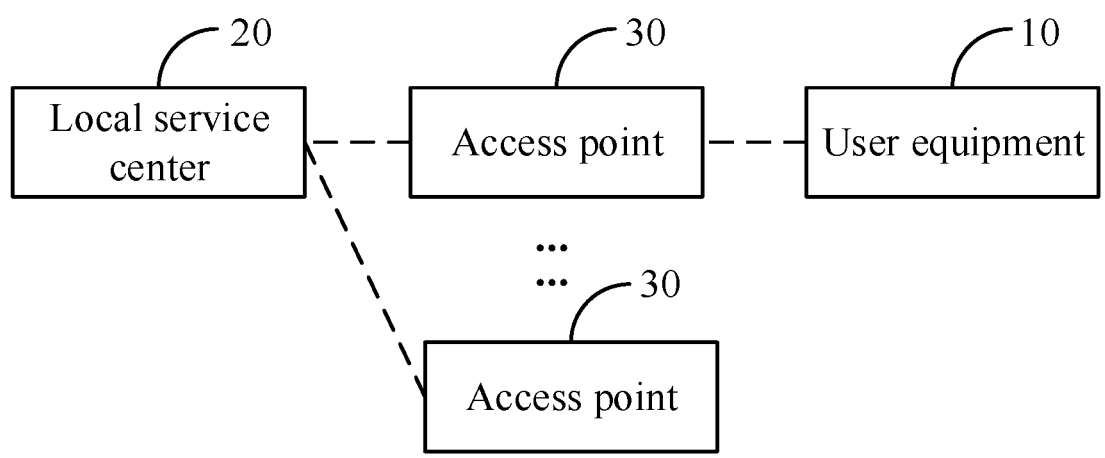
FIG. 2 is a schematic structural diagram of a system for access control according to an embodiment of the invention.

As illustrated in FIG. 2, a system for access control according to an embodiment of the invention includes a UE 10, an LSC 20 and at least one AP 30.

The UE 10 is configured to perform network layer mutual authentication with the LSC when the UE needs to access a network; and perform access layer mutual authentication with a corresponding APG after the network layer mutual authentication is passed, so that the UE accesses the APG after the access layer mutual authentication is passed.

The LSC 20 is configured to perform network layer mutual authentication with the UE after receiving an access request message from the UE; determine the APG corresponding to the UE after determining that the network layer mutual authentication with the UE is passed; and instruct the APG to perform access layer mutual authentication with the UE, so that the APG allows the UE to access the APG after the access layer mutual authentication is passed.

The AP 30 is configured to receive from the LSC an access layer authentication parameter corresponding to the UE, where the access layer authentication parameter is transmitted by the LSC after the LSC determines that network layer mutual authentication with the UE is passed; and perform access layer mutual authentication with the UE, and allow the UE to access the AP after determining that the access layer mutual authentication with the UE is passed.

In the embodiment of the invention, when the UE needs to access the network, it performs network layer mutual authentication with the LSC first, and after the network layer mutual authentication is passed, it performs access layer mutual authentication with the target AP in the corresponding APG. Since mutual authentication at double layers is performed, and the UE can access the corresponding APG after the mutual authentication at double layers succeeds, the UE can access the corresponding APG safely.

In a possible implementation, the UE needs to access the network when it is powered on.

When the UE needs to access the network, the UE transmits an access request message to the LSC via an AP.

Take it as an example that the UE needs to access the network when it is powered on. The way(s) of determining the AP for forwarding the access request message includes one or more of the following: the UE transmitting the access request message via an AP which is nearest to the UE; the UE transmitting the access request message via an AP having a strongest signal strength; or, the UE transmitting the access request message via a specified AP.

After the LSC receives the access request message transmitted by the UE, the LSC requests from the NSC a network layer authentication parameter corresponding to the UE according to context information of the UE in the access request message.

Particularly, the LSC transmits an authentication parameter request message to the NSC, and the authentication parameter request message includes identification information of the UE.

The NSC receives the authentication parameter request message transmitted by the LSC, and generates the network layer authentication parameter corresponding to the UE according to the identification information of the UE in the authentication parameter request message.

The network layer authentication parameter includes an RAND (random number), an XRES (expected response parameter), an AUTN (authentication token), and $K_{LSC}$ (temporary key).

Where, $K_{LSC}$ is determined according to a root key k corresponding to the UE and stored by the NSC, and the RAND in the network layer authentication parameter; and the $K_{LSC}$ is used by the LSC to derive a communication key for communication between the UE and the network.

The NSC transmits to the LSC the generated network layer authentication parameter corresponding to the UE and the LSC saves the received network layer authentication parameter corresponding to the UE locally.

In the embodiment of the invention, when the UE needs to access the network, to insure that the UE accesses the network safely, mutual authentication at two layers between the UE and the network is required. That is, two authentications, such as network layer mutual authentication between the UE and the LSC, and access layer mutual authentication between the UE and the APG, are required. After the two authentications succeed, the UE accesses the corresponding APG.

Where network layer mutual authentication and access layer mutual authentication will be illustrated below, respectively.

1. Network layer mutual authentication between the UE and the LSC.

Optionally, the LSC performs network layer mutual authentication with the UE according to the network layer authentication parameter.

The LSC transmits a network layer authentication request message including the network layer authentication parameter to the UE, so that the UE authenticates the network according to the network layer authentication request message. If the LSC receives a network layer authentication request response message transmitted by the UE, the LSC authenticates the UE according to the network layer authentication request response message.

It is noteworthy that the network layer authentication request message including the network layer authentication parameter transmitted from the LSC to the UE, is forwarded by the AP which forwards the access request message; and the network layer authentication request response message transmitted by the UE is also forwarded by the AP which forwards the access request message.

Figure 3:
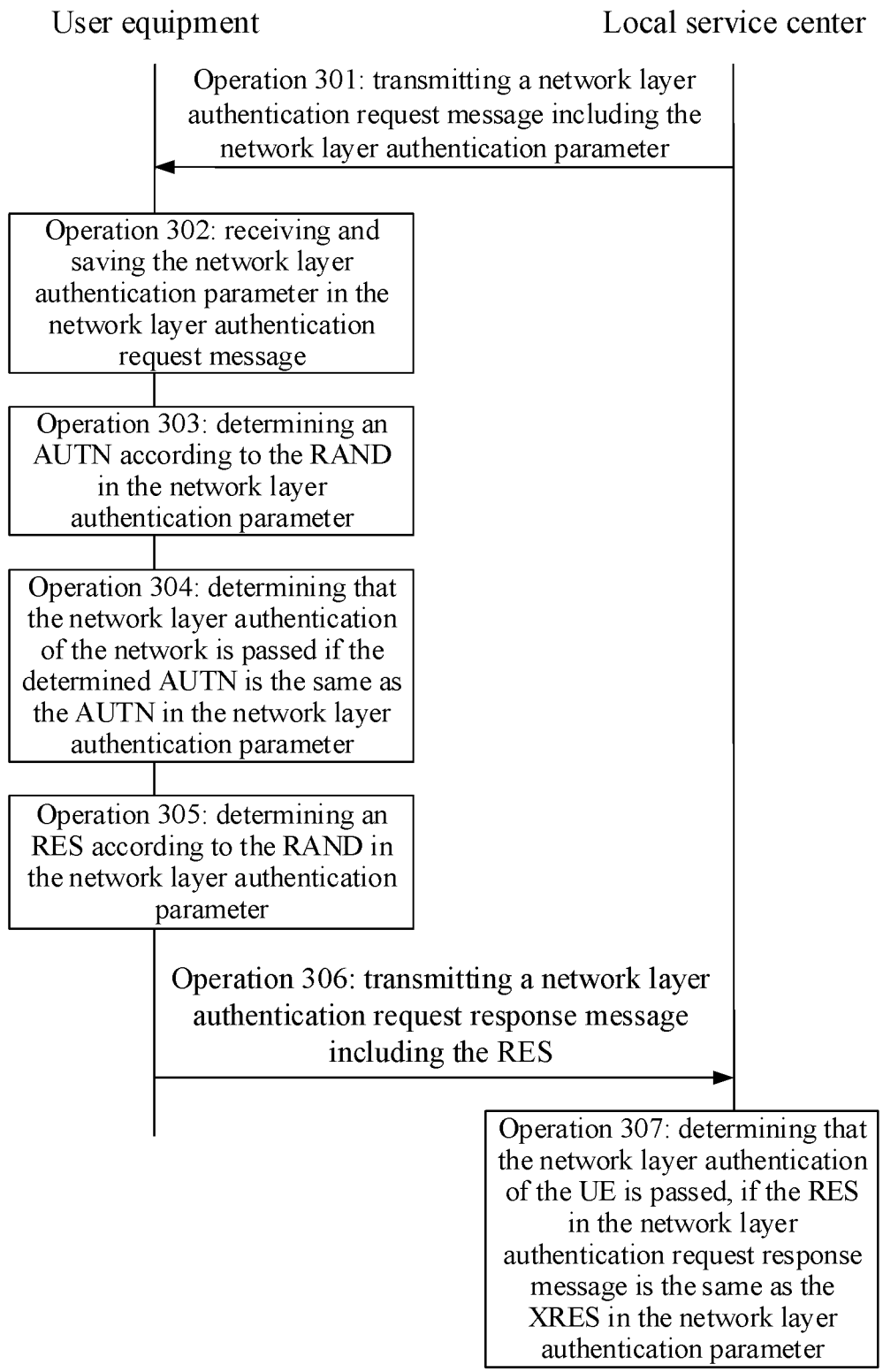
FIG. 3 is a flow chart of network layer mutual authentication between a UE and an LSC according to an embodiment of the invention.

Particularly, FIG. 3 illustrates a flow chart of network layer mutual authentication between the UE and the LSC.

Operation 301: the LSC transmits a network layer authentication request message including the network layer authentication parameter to the UE.

Operation 302: the UE receives and saves the network layer authentication parameter in the network layer authentication request message.

Operation 303: the UE determines an AUTN according to the RAND in the network layer authentication parameter.

Operation 304: if the AUTN determined by the UE is the same as the AUTN in the network layer authentication parameter, the UE determines that the network layer authentication of the network is passed.

Operation 305: the UE determines an RES (authentication response parameter) according to the RAND in the network layer authentication parameter.

Operation 306: the UE transmits a network layer authentication request response message including the RES to the LSC.

Operation 307: the LSC determines that the network layer authentication of the UE is passed, if the RES in the network layer authentication request response message is the same as an XRES in the network layer authentication parameter.

It is noteworthy that, if the network layer authentication of the network by the UE fails, or the network layer authentication of the UE by the LSC fails, the UE cannot access the network.

In the embodiment of the invention, after determining that the network layer mutual authentication between the LSC and the UE succeeds, the LSC requests the NSC to allocate an APG identifier for the UE.

In the embodiment of the invention, the APG identifier corresponding to the UE can be determined by: requesting, by the LSC, the NSC to allocate an APG identifier for an APG corresponding to the UE.

Particularly, when the NSC allocates the APG identifier for the APG corresponding to the UE, it may only transmit the APG identifier allocated for the APG to the LSC. Or, the NSC transmits a group of APG identifiers to the LSC in advance, and after the LSC determines that the network layer mutual authentication between the LSC and the UE succeeds, the LSC selects an APG identifier which has not been allocated in the group of APG identifiers and allocates this APG identifier for the UE.

After determining the APG identifier corresponding to the UE, the LSC notifies the UE of the APG identifier allocated for the UE.

After determining the APG identifier corresponding to the UE, the LSC generates an APG providing a communication service to UE.

Particularly, the LSC can determine the APG providing the communication service to the UE in one or more of the following ways.

1) The LSC selects N number of APs having the strongest reference signal strength to constitute the APG corresponding to the UE, according to reference signal strength of each AP received by the UE.

2) The LSC selects N number of APs having the maximum communication cooperation gain to constitute the APG corresponding to the UE, according to a communication cooperation gain generated by each AP with respect to the UE.

3) The LSC selects N number of APs which make requests first to constitute the APG corresponding to the UE, according to a time instance when each AP makes its request to the LSC to join the APG corresponding to the UE.

4) The LSC designates N number of APs to constitute the APG corresponding to the UE.

It is noteworthy that, the ways of determining the APG providing the communication service to the UE above are just examples. The methods of determining the APG corresponding to the UE which the embodiment of the invention intends to protect are not limited to these examples and any method that is able to determine the APG providing the communication service to the UE applies to the embodiment of the invention.

2. Access layer mutual authentication between the UE and the APG.

In the embodiment of the invention, the access layer mutual authentication between the UE and the APG refers to access layer mutual authentication between the UE and a target AP in the APG.

Optionally, the LSC determines the target AP in the APG and the LSC notifies the target AP to perform access layer mutual authentication with the UE.

The LSC determines the target AP in the APG using one or more of the following methods.

Method 1: the LSC determines an AP having the strongest reference signal strength received by the UE in the APG as the target AP.

Method 2: the LSC determines an AP having the maximum communication cooperation gain with respect to the UE in the APG as the target AP.

Method 3: the LSC determines an AP making the request to join the APG first as the target AP.

Method 4: the LSC designates an AP in the APG arbitrarily as the target AP.

It is noteworthy that the above-mentioned methods for determining the target AP are just examples, and the methods for determining the target AP which the embodiment of the invention intends to protect are not limited to these examples. Any method that is able to determine the target AP applies to the embodiment of the invention.

After determining the target AP in the APG, the LSC instructs the target AP to perform access layer mutual authentication with the UE.

Optionally, the LSC transmits the APG identifier corresponding to the APG and the access layer authentication parameter corresponding to the UE to the target AP, so that the target AP performs access layer mutual authentication with the UE according to the APG identifier and the access layer authentication parameter.

The LSC determines the access layer authentication parameter corresponding to the UE using either of the following methods.

Method 1: the LSC obtains the access layer authentication parameter corresponding to the UE from the LSC.

Optionally, the LSC transmits an access layer authentication parameter request message to the NSC, where the access layer authentication parameter request message includes the APG identifier.

The NSC receives the access layer authentication parameter request message transmitted by the LSC, and generates the access layer authentication parameter corresponding to the UE according to the APG identifier in the access layer authentication parameter request message.

The access layer authentication parameter includes an RAND, an XRES, an AUTN and $K_{APG}$ (intermediate key). Where $K_{APG}$ is determined according to a root key k corresponding to the UE and stored by the NSC, the APG identifier APG_ID included in the access layer authentication parameter request message, and the RAND in the network layer authentication parameter. Moreover, the $K_{APG}$ is used by the LSC to derive a communication key for communication between the UE and the network.

Method 2: the LSC determines the access layer authentication parameter corresponding to the UE according to the network layer authentication parameter corresponding to the UE and the APG identifier.

The LSC determines the access layer authentication parameter corresponding to the UE according to the RAND, XRES, AUTN and $K_{LSC}$ in the network layer authentication parameter obtained from the NSC and the APG identifier, APG_IG.

Optionally, $K_{APG}$ is determined according to $K_{LSC}$ and APG_ID; and the RAND, XRES, AUTN, and $K_{APG}$ are used as the access layer authentication parameter.

It is noteworthy that, according to the embodiment of the invention, since each AP may belong to different APGs, i.e., one AP may provide communication services to multiple UEs simultaneously, when the target AP in the APG performs access layer mutual authentication with the UE, messages transmitted during the authentication between the target AP and the UE need to include the APG identifier, so that the target AP and the UE can perform authentication safely and accurately.

Optionally, when transmitting the determined access layer authentication parameter to the target AP, the LSC needs to transmit to the target AP identification information of the UE corresponding to the access layer authentication parameter, so that the target AP determines the UE, which needs to perform access layer authentication.

Where the access layer mutual authentication between the UE and the target AP will be described below in detail.

Figure 4:
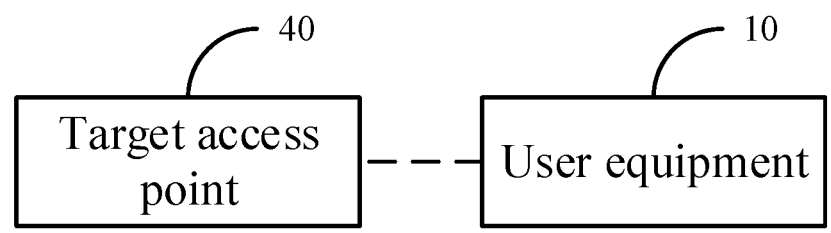
FIG. 4 is a schematic structural diagram of a system performing access layer mutual authentication according to an embodiment of the invention.

As illustrated in FIG. 4, a system performing access layer mutual authentication according to the embodiment of the invention includes a UE 10 and a target AP 40.

The target AP 40 is configured to: send an access layer authentication request message including an APG identifier and an access layer authentication parameter to the UE so that the UE authenticates a network according to the access layer authentication request message; and authenticate the UE according to an access layer authentication request response message if the target AP receives the access layer authentication request response message including the APG identifier from the UE.

The UE 10 is configured to: authenticate the network according to the access layer authentication request message including the APG identifier and sent by the target AP in the APG; and transmit to the target AP the access layer authentication request response message including the APG identifier after the authentication succeeds, so that the target AP authenticates the UE according to the access layer authentication request response message.

Where the access layer authentication request message transmitted from the target AP to the UE includes the APG identifier APG_ID, and the access layer authentication parameter including the RAND and AUTN.

Where the APG identifier APG_ID can be added into the access layer authentication request message as an individual parameter. Or, the APG identifier APG_ID and some parameter in the access layer authentication parameter can be XORed and added in a hidden way to the access layer authentication request message, for example, APG_ID and AUTN can be XORed.

Correspondingly, if the APG identifier APG_ID, and some parameter in the access layer authentication parameter are XORed and added in a hidden way to the access layer authentication request message to be transmitted, then the UE will parse the access layer authentication parameter for the APG_ID upon reception of the access layer authentication request message.

The access layer mutual authentication between the UE and the target AP includes: network authentication on the target AP by the UE, and authentication on the UE by the target AP.

1) The UE performs network authentication on the target AP.

The UE authenticates the network according to the access layer authentication request message including the APG identifier and sent by the target AP in the APG.

Particularly, the UE determines a second authentication token according to the random number in the access layer authentication request message. If the second authentication token and a first authentication token in the access layer authentication request message are the same, then the UE determines that the authentication of the network is passed.

That is, the UE determines an AUTN according to the RAND in the access layer authentication request message. If the AUTN determined by the UE is the same as the AUTN in the access layer authentication request message, then it is determined that the authentication of the network is passed.

The UE transmits the access layer authentication request response message including the APG identifier to the target AP after the authentication of the network is passed, so that the target AP authenticates the UE according to the access layer authentication request response message.

Optionally, the UE determines an authentication response parameter according to the random number. The UE transmits the access layer authentication request response message including the APG identifier and the authentication response parameter to the target AP so that the target AP authenticates the UE according to the APG identifier and the authentication response parameter.

That is, after the authentication of the network is passed, the UE determines an RES (authentication response parameter) according to the RAND in the access layer authentication parameter, and transmits the access layer authentication response message including the APG_ID and RES to the LSC.

Where the APG identifier APG_ID can be added into the access layer authentication response message as an individual parameter. Or, the APG identifier APG_ID and the authentication response parameter can be XORed and added in a hidden way to the access layer authentication response message, for example, APG_ID and RES can be XORed.

Correspondingly, if the APG identifier APG_ID and the authentication response parameter are XORed and added in a hidden way to the access layer authentication response message to be transmitted, then the UE will parse the authentication response parameter for the APG_ID upon reception of the access layer authentication response message.

2) The target AP authenticates the UE.

The target AP receives the access layer authentication request response message including the APG identifier and transmitted by the UE, and authenticates the UE according to the access layer authentication request response message.

If the authentication response parameter in the access layer authentication request response message is the same as the expected response parameter in the access layer authentication parameter, the target AP determines that the authentication of the UE is passed.

Figure 5:
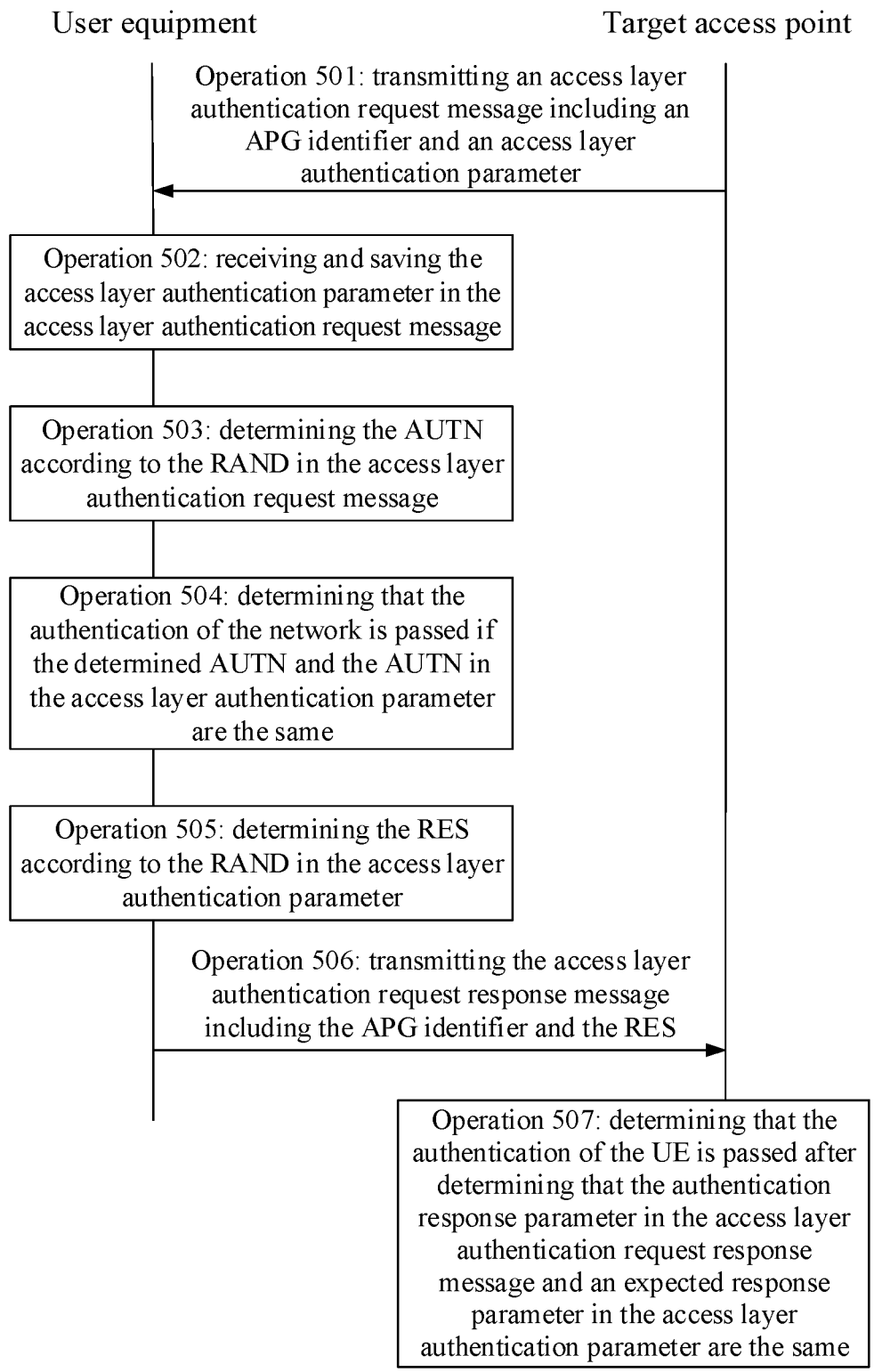
FIG. 5 is a flow chart of access layer mutual authentication between a UE and a target AP according to an embodiment of the invention.

Optionally, the target AP determines whether the RES in the access layer authentication response message is the same as the XRES in the access layer authentication parameter, and if it is, the target AP determines that the authentication of the UE is passed.

Where FIG. 5 illustrates a flow chart of the access layer mutual authentication between the UE and the target AP.

At operation 501, the target AP transmits to the UE an access layer authentication request message including an APG identifier and an access layer authentication parameter.

At operation 502, the UE receives and saves the access layer authentication parameter in the access layer authentication request message.

At operation 503, the UE determines an AUTN according to the RAND in the access layer authentication request message.

At operation 504, if the AUTN determined by the UE and the AUTN in the access layer authentication parameter are the same, the UE determines that the authentication of the network is passed.

At operation 505, the UE determines an RES according to the RAND in the access layer authentication parameter.

At operation 506, the UE transmits to the target AP an access layer authentication request response message including the APG identifier and the RES.

At operation 507, the target AP determines that the authentication of the UE is passed after determining that the authentication response parameter in the access layer authentication request response message and the expected response parameter in the access layer authentication parameter are the same.

In the embodiment of the invention, the AP can be a base station (such as a macro base station or a home base station), or it can be another kind of AP as well.

Figure 6:
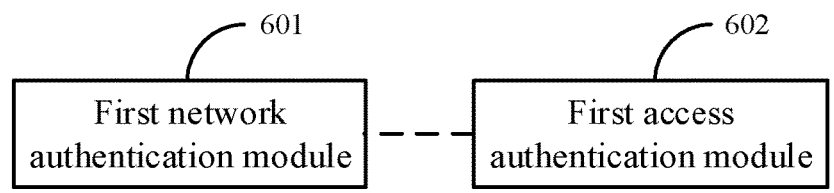
FIG. 6 is a schematic structural diagram of a first UE according to an embodiment of the invention.

As illustrated in FIG. 6, a UE according to an embodiment of the invention includes a first network authentication module 601 configured to perform network layer mutual authentication with an LSC when the UE needs to access a network; and a first access authentication module 602 configured to perform access layer mutual authentication with a corresponding APG after the network layer mutual authentication is passed, so that the UE accesses the corresponding APG after the access layer mutual authentication is passed.

Optionally, the first access authentication module 602 is further configured to: authenticate the network according to an access layer authentication request message including an APG identifier and transmitted by a target access point AP in the APG; and transmit an access layer authentication request response message including the APG identifier to the target AP after the authentication of the network is passed, so that the target AP authenticates the UE according to the access layer authentication request response message.

Optionally, the first access authentication module 602 is further configured to: determine a second authentication token according to a random number in the access layer authentication request message; and determine that the authentication of the network is passed if the second authentication token and a first authentication token in the access layer authentication request message are the same.

Optionally, the first access authentication module 602 is further configured to: determine an authentication response parameter according to the random number after the authentication of the network is passed; and transmit the access layer authentication request response message including the APG identifier and the authentication response parameter to the target AP, so that the target AP authenticates the UE according to the APG identifier and the authentication response parameter.

Figure 7:
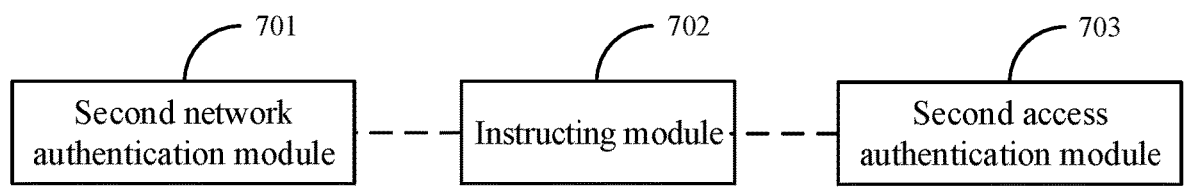
FIG. 7 is a schematic structural diagram of a first LSC according to an embodiment of the invention.

As illustrated in FIG. 7, an LSC according to an embodiment of the invention includes a second network authentication module 701 configured to perform network layer mutual authentication with a UE after receiving an access request message from the UE; an instructing module 702 configured to determine an APG corresponding to the UE after determining that the network layer mutual authentication with the UE is passed; and a second access authentication module 703 configured to instruct the APG to perform access layer mutual authentication with the UE, so that the APG allows the UE to access the APG after the access layer mutual authentication is passed.

Optionally, the second network authentication module 701 is further configured to: request a network layer authentication parameter corresponding to the UE from a network service center, according to context information of the UE in the access request message, after receiving the access request message from the UE and before performing network layer mutual authentication with the UE. And the second network authentication module 701 is further configured to perform network layer mutual authentication with the UE according to the network layer authentication parameter.

Optionally, the second network authentication module 701 is further configured to: transmit a network layer authentication request message including the network layer authentication parameter to the UE, so that the UE authenticates a network according to the network layer authentication request message; and authenticate the UE according to a network layer authentication request response message when the network layer authentication request response message transmitted by the UE is received.

Optionally, the second network authentication module 701 is further configured to: determine that the authentication of the UE is passed if an authentication response parameter included in the network layer authentication request response message and an expected response parameter in the network layer authentication parameter are the same.

Optionally, the second access authentication module 703 is further configured to: determine a target AP in the APG; and instruct the target AP to perform access layer mutual authentication with the UE.

Optionally, the second access authentication module 703 is further configured to: transmit to the target AP an APG identifier corresponding to the APG and an access layer authentication parameter corresponding to the UE, so that the target AP performs access layer mutual authentication with the UE according to the APG identifier and the access layer authentication parameter.

Optionally, the second access authentication module 703 is further configured to determine the access layer authentication parameter corresponding to the UE by: obtaining the access layer authentication parameter corresponding to the UE from a network service center; or, determining the access layer authentication parameter corresponding to the UE, according to the network layer authentication parameter corresponding to the UE, and the APG identifier.

Figure 8:
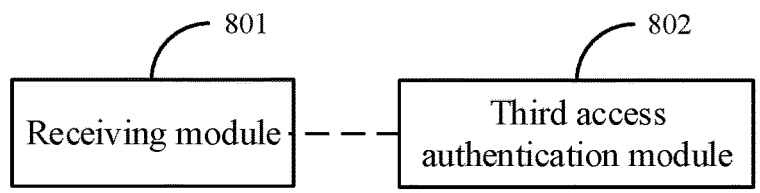
FIG. 8 is a schematic structural diagram of a first AP according to an embodiment of the invention.

As illustrated in FIG. 8, an AP according to an embodiment of the invention includes a receiving module 801 configured to receive from an LSC an access layer authentication parameter corresponding to a UE, where the access layer authentication parameter is transmitted by the LSC after the LSC determines that network layer mutual authentication with the UE is passed; and a third access authentication module 802 configured to perform access layer mutual authentication with the UE, and to allow the UE to access the AP after determining that the access layer mutual authentication with the UE is passed.

Optionally, the third access authentication module 802 is further configured to: transmit an access layer authentication request message including both an APG identifier and the access layer authentication parameter to the UE, so that the UE authenticates a network according to the access layer authentication request message; and authenticate the UE according to an access layer authentication request response message if the access layer authentication request response message including the APG identifier is received from the UE.

Optionally, the third access authentication module 802 is further configured to determine that the authentication of the UE is passed if an authentication response parameter included in the access layer authentication request response message and an expected response parameter in the access layer authentication parameter are the same.

Figure 9:
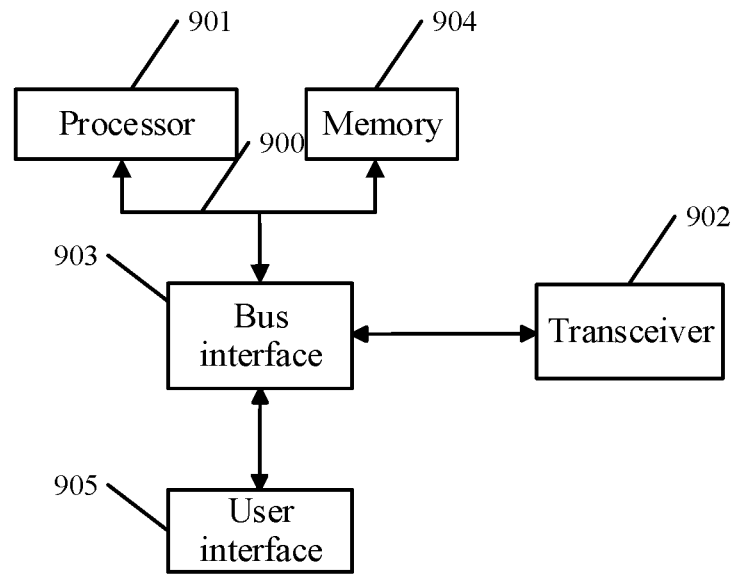
FIG. 9 is a schematic structural diagram of a second UE according to an embodiment of the invention.

As illustrated in FIG. 9, another UE according to an embodiment of the invention includes a processor 901 configured to read a program in a memory 904 to: perform network layer mutual authentication with an LSC when the UE needs to access a network; and perform access layer mutual authentication with a corresponding APG after the network layer mutual authentication is passed, so that the UE accesses the corresponding APG after the access layer mutual authentication is passed. The UE also includes a transceiver 902 configured to receive and transmit data under the control of the processor 901.

Optionally, the processor 901 is further configured to: authenticate the network according to an access layer authentication request message including an APG identifier and transmitted by a target access point AP in the APG; and transmit an access layer authentication request response message including the APG identifier to the target AP through the transceiver 902 after the authentication of the network is passed, so that the target AP authenticates the UE according to the access layer authentication request response message.

Optionally, the processor 901 is further configured to: determine a second authentication token according to a random number in the access layer authentication request message; and determine that the authentication of the network is passed if the second authentication token and a first authentication token in the access layer authentication request message are the same.

Optionally, the processor 901 is further configured to: determine an authentication response parameter according to the random number after the authentication of the network is passed; and transmit the access layer authentication request response message including the APG identifier and the authentication response parameter via the transceiver 902 to the target AP, so that the target AP authenticates the UE according to the APG identifier and the authentication response parameter.

In practice, interaction between the processor 901 and the LSC, and between the processor 901 and the AP, is realized through the transceiver 902, which will not be described herein, respectively.

In FIG. 9, bus architecture is represented by a bus 900. The bus 900 may include interconnected buses and bridges in any quantity, and links together various circuits including one or more processors represented by the processor 901, and one or more memories represented by the memory 904. The bus 900 can further link together various other circuits, such as a peripheral device, a manostat, or a power management circuit, all of which are well known in the art, so a further description thereof is omitted herein. A bus interface 903 serves as an interface between the bus 900 and the transceiver 902. The transceiver 902 can be an element, or multiple elements such as multiple receivers and transmitters, so as to provide units for communicating with various other devices via a transmission medium. For example, the transceiver 902 receives external data from another device, or transmits data processed by the processor 901 to another device. Depending on the nature of the computing system, a user interface 905 can be provided, such as a keypad, a monitor, a loudspeaker, a microphone, or a joystick.

The processor 901 is responsible for managing the bus 900 and performing normal processes, e.g., running a universal operating system as described above. The memory 904 can be configured to store data for use by the processor 901 in performing the operations.

Optionally, the processor 901 can be a central processing unit (CPU), an Application Specific Integrated Circuit (ASIC), a Field-Programmable Gate Array (FPGA) or a Complex Programmable Logic Device (CPLD).

Figure 10:
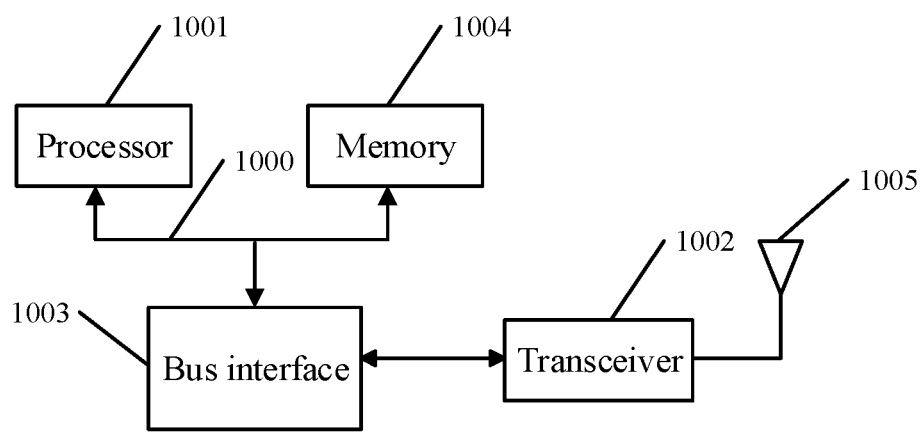
FIG. 10 is a schematic structural diagram of a second LSC according to an embodiment of the invention.

As illustrated in FIG. 10, another LSC according to an embodiment of the invention includes a processor 1001 configured to read a program in a memory 1004 to: perform network layer mutual authentication with a UE after receiving an access request message from the UE; determine an APG corresponding to the UE after determining that the network layer mutual authentication with the UE is passed; and instruct the APG via a transceiver 1002 to perform access layer mutual authentication with the UE, so that the APG allows the UE to access the APG after the access layer mutual authentication is passed. The LSC also includes the transceiver 1002 configured to transmit and receive data under the control of the processor 1001.

Optionally, the processor 1001 is further configured to: request a network layer authentication parameter corresponding to the UE from a network service center, according to context information of the UE in the access request message, after receiving the access request message from the UE and before performing network layer mutual authentication with the UE. The processor 1001 is further configured to perform network layer mutual authentication with the UE according to the network layer authentication parameter.

Optionally, the processor 1001 is further configured to: transmit a network layer authentication request message including the network layer authentication parameter to the UE, so that the UE authenticates a network according to the network layer authentication request message; and authenticate the UE according to a network layer authentication request response message when the network layer authentication request response message transmitted by the UE is received.

Optionally, the processor 1001 is further configured to: determine that the authentication of the UE is passed if an authentication response parameter included in the network layer authentication request response message and an expected response parameter in the network layer authentication parameter are the same.

Optionally, the processor 1001 is further configured to: determine a target AP in the APG; and instruct the target AP to perform access layer mutual authentication with the UE.

Optionally, the processor 1001 is further configured to: transmit to the target AP an APG identifier corresponding to the APG and an access layer authentication parameter corresponding to the UE, so that the target AP performs access layer mutual authentication with the UE according to the APG identifier and the access layer authentication parameter.

Optionally, the processor 1001 is further configured to determine the access layer authentication parameter corresponding to the UE by: obtaining the access layer authentication parameter corresponding to the UE from a network service center; or, determining the access layer authentication parameter corresponding to the UE, according to the network layer authentication parameter corresponding to the UE and the APG identifier.

In practice, interaction between the processor 1001 and the UE is realized through the transceiver 1002 and the AP. That is, the processor 1001 transmits information, that needs to be sent to the UE, to the AP via the transceiver 1002, and the AP transmits the information for the UE to the UE; the AP transmits to the LSC the information, that needs to be sent to the LSC, from the UE after receiving the information for the LSC, and the processor 1001 receives the information for the LSC via the transceiver 1002.

Where the connection between the LSC and the AP can be wired or wireless, etc.

In FIG. 10, bus architecture is represented by a bus 1000. The bus 1000 may include interconnected buses and bridges in any quantity, and links together various circuits including one or more processors represented by the processor 1001, and one or more memories represented by the memory 1004. The bus 1000 can further link together various other circuits, such as a peripheral device, a manostat, or a power management circuit, all of which are well known in the art, so a further description thereof is omitted herein. A bus interface 1003 serves as an interface between the bus 1000 and the transceiver 1002. The transceiver 1002 can be an element, or multiple elements such as multiple receivers and transmitters, so as to provide units for communicating with various other devices via a transmission medium. Data processed by the processor 1001 can be transmitted via an antenna 1005 over a wireless transmission medium. Moreover, the antenna 1005 receives data and transmits the data to the processor 1001.

The processor 1001 is responsible for managing the bus 1000 and performing normal processes. It can also provide various other functions such as a timer, a peripheral interface, a voltage regulator, power management, and other control functions. The memory 1004 can be configured to store data for use by the processor 1001 in performing operations.

Optionally, the processor 1001 can be a CPU, an ASIC, an FPGA or a CPLD.

Figure 11:
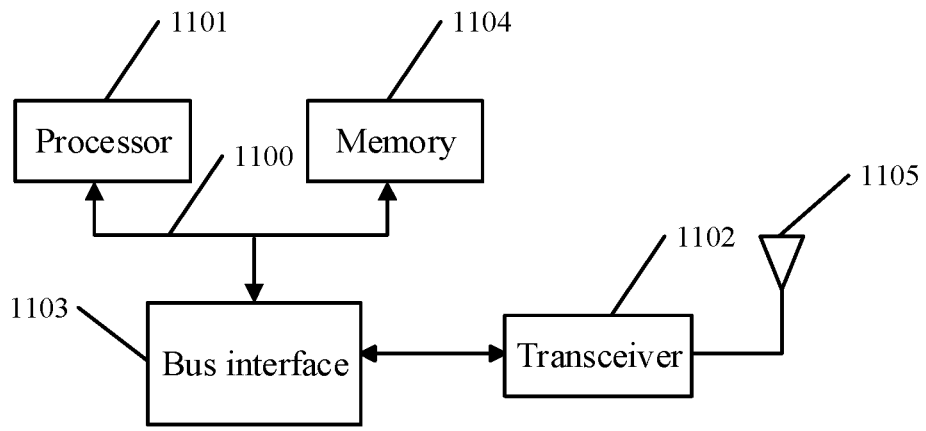
FIG. 11 is a schematic structural diagram of a second AP according to an embodiment of the invention.

As illustrated in FIG. 11, another AP according to an embodiment of the invention includes: a memory 1101 configured to read a program in a memory 1104 to: receive from an LSC an access layer authentication parameter corresponding to a UE via a transceiver 1102, where the access layer authentication parameter is transmitted by the LSC after the LSC determines that network layer mutual authentication with the UE is passed; perform access layer mutual authentication with the UE, and allow the UE to access the AP after determining that the access layer mutual authentication with the UE is passed. The AP also includes the transceiver 1102 configured to transmit and receive data under the control of the processor 1101.

Optionally, the processor 1101 is further configured to: transmit an access layer authentication request message including both an APG identifier and the access layer authentication parameter to the UE via the transceiver 1102, so that the UE authenticates a network according to the access layer authentication request message; and authenticate the UE according to an access layer authentication request response message if the access layer authentication request response message including the APG identifier is received from the UE via the transceiver 1102.

Optionally, the processor 1101 is further configured to determine that the authentication of the UE is passed if an authentication response parameter included in the access layer authentication request response message and an expected response parameter in the access layer authentication parameter are the same.

In practice, interaction between the processor 1101 and the UE, and between the processor 1101 and the LSC, is realized through the transceiver 1102. The transceiver 1102 has at least two transmission modes, where one transmission mode is used for interaction with the UE, e.g., a wireless transmission mode, and the other transmission mode can be used for interaction with the LSC, e.g., a wireless or wired transmission mode.

Where, the connection between the LSC and the AP can be wired or wireless, etc. The connection between the AP and the UE is wireless.

In FIG. 11, bus architecture is represented by a bus 1100. The bus 1100 may include interconnected buses and bridges in any quantity, and links together various circuits including one or more processors represented by the processor 1101, and one or more memories represented by the memory 1104. The bus 1100 can further link together various other circuits, such as a peripheral device, a manostat, or a power management circuit, all of which are well known in the art, so a further description thereof is omitted herein. A bus interface 1103 serves as an interface between the bus 1100 and the transceiver 1102. The transceiver 1102 can be an element, or multiple elements such as multiple receivers and transmitters, so as to provide units for communicating with various other devices via a transmission medium. Data processed by the processor 1101 can be transmitted via an antenna 1105 over a wireless transmission medium. Moreover, the antenna 1105 receives data and transmits the data to the processor 1101.

The processor 1101 is responsible for managing the bus 1100 and performing normal processes. It can also provide various other functions such as a timer, a peripheral interface, a voltage regulator, power management, and other control functions. The memory 1104 can be configured to store data for use by the processor 1101 in performing operations.

Optionally, the processor 1101 can be a CPU, an ASIC, an FPGA or a CPLD.

Based upon the same inventive concept, an embodiment of the invention provides a method for access control. Since the device corresponding to the method is the UE in the system for access control according to the previous embodiment of the invention, and principles for solving the problem by the method and by the device are similar, details of implementation of the method can be referred to the implementation of the device, which are not repeated herein.

Figure 12:
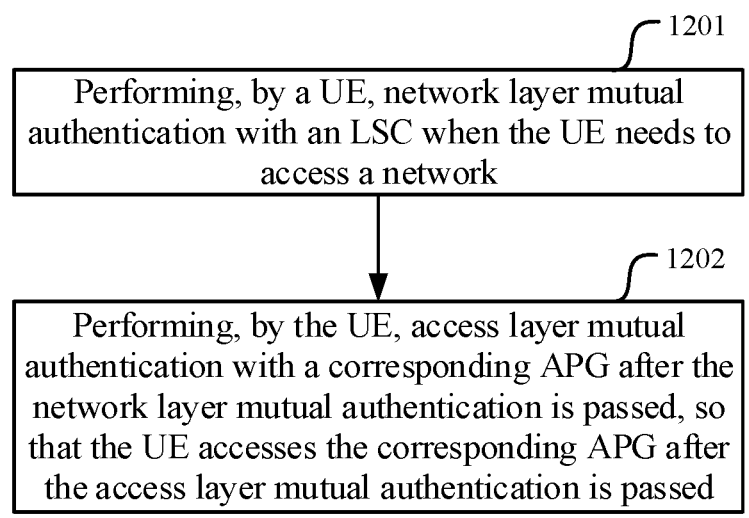
FIG. 12 is a schematic flow chart of a method for access control at a UE side according to an embodiment of the invention.

As illustrated in FIG. 12, the method for access control according to the embodiment of the invention includes following operations.

Operation 1201: performing, by a UE, network layer mutual authentication with an LSC when the UE needs to access a network.

Operation 1202: performing, by the UE, access layer mutual authentication with a corresponding APG after the network layer mutual authentication is passed, so that the UE accesses the corresponding APG after the access layer mutual authentication is passed.

Optionally, performing, by the UE, access layer mutual authentication with the corresponding APG, includes: authenticating, by the UE, the network according to an access layer authentication request message including an APG identifier and transmitted by a target AP in the APG; and transmitting, by the UE, an access layer authentication request response message including the APG identifier to the target AP after the authentication of the network is passed, so that the target AP authenticates the UE according to the access layer authentication request response message.

Optionally, authenticating, by the UE, the network according to the access layer authentication request message including the APG identifier and transmitted by the target AP in the APG, includes: determining, by the UE, a second authentication token according to a random number in the access layer authentication request message; and determining, by the UE, that the authentication of the network is passed if the second authentication token and a first authentication token in the access layer authentication request message are the same.

Optionally, transmitting, by the UE, the access layer authentication request response message including the APG identifier to the target AP after the authentication of the network is passed, includes: determining, by the UE, an authentication response parameter according to the random number after the authentication of the network is passed; and transmitting, by the UE, the access layer authentication request response message including the APG identifier and the authentication response parameter to the target AP, so that the target AP authenticates the UE according to the APG identifier and the authentication response parameter.

Based upon the same inventive concept, an embodiment of the invention provides another method for access control. Since the device corresponding to the method is the LSC in the system for access control according to the previous embodiment of the invention, and principles for solving the problem by the method and by the device are similar, details of implementation of the method can be referred to the implementation of the device, which are not repeated herein.

Figure 13:
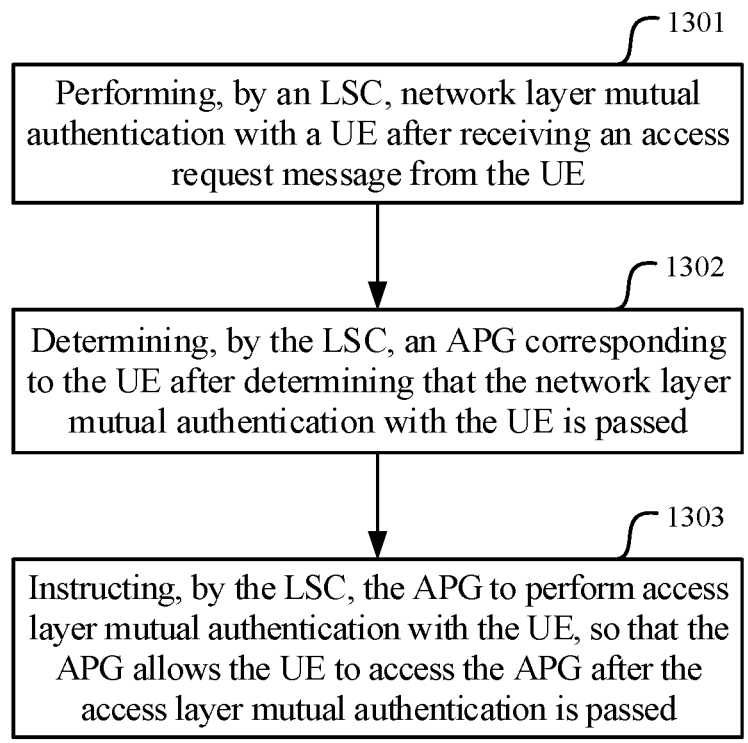
FIG. 13 is a schematic flow chart of a method of an LSC assisting access control for a UE according to an embodiment of the invention.

As illustrated in FIG. 13, the method for access control according to the embodiment of the invention includes following operations.

Operation 1301: performing, by an LSC, network layer mutual authentication with a UE after receiving an access request message from the UE.

Operation 1302: determining, by the LSC, an APG corresponding to the UE after determining that the network layer mutual authentication with the UE is passed.

Operation 1303: instructing, by the LSC, the APG to perform access layer mutual authentication with the UE, so that the APG allows the UE to access the APG after the access layer mutual authentication is passed.

Optionally, after receiving, by the LSC, the access request message from the UE and before performing, by the LSC, network layer mutual authentication with the UE, the method further includes: requesting, by the LSC, a network layer authentication parameter corresponding to the UE from a network service center, according to context information of the UE in the access request message. Performing, by the LSC, network layer mutual authentication with the UE, includes: performing, by the LSC, network layer mutual authentication with the UE according to the network layer authentication parameter.

Optionally, performing, by the LSC, network layer mutual authentication with the UE according to the network layer authentication parameter, includes: transmitting, by the LSC, a network layer authentication request message including the network layer authentication parameter to the UE, so that the UE authenticates a network according to the network layer authentication request message; and authenticating, by the LSC, the UE according to a network layer authentication request response message if the LSC receives the network layer authentication request response message transmitted by the UE.

Optionally, authenticating, by the LSC, the UE according to the network layer authentication request response message transmitted by the UE, includes: determining, by the LSC, that the authentication of the UE is passed if an authentication response parameter included in the network layer authentication request response message and an expected response parameter in the network layer authentication parameter are the same.

Optionally, instructing, by the LSC, the APG to perform access layer mutual authentication with the UE, includes: determining, by the LSC, a target AP in the APG; and instructing, by the LSC, the target AP to perform access layer mutual authentication with the UE.

Optionally, instructing, by the LSC, the target AP to perform access layer mutual authentication with the UE, includes: transmitting, by the LSC, to the target AP an APG identifier corresponding to the APG and an access layer authentication parameter corresponding to the UE, so that the target AP performs access layer mutual authentication with the UE according to the APG identifier and the access layer authentication parameter.

Optionally, the LSC determines the access layer authentication parameter corresponding to the UE by: obtaining the access layer authentication parameter corresponding to the UE from a network service center; or, determining the access layer authentication parameter corresponding to the UE, according to the network layer authentication parameter corresponding to the UE and according to the APG identifier.

Based upon the same inventive concept, an embodiment of the invention provides a method for access control. Since the device corresponding to the method is the AP in the system for access control according to the previous embodiment of the invention, and principles for solving the problem by the method and by the device are similar, details of implementation of the method can be referred to the implementation of the device, which are not repeated herein.

Figure 14:
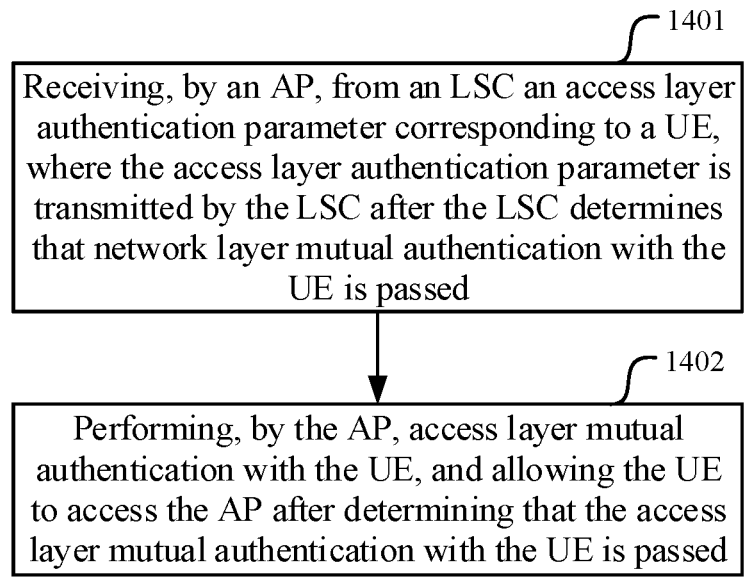
FIG. 14 is a schematic flow chart of a method of an AP assisting access control for a UE according to an embodiment of the invention.

As illustrated in FIG. 14, the method for access control according to the embodiment of the invention includes following operations.

Operation 1401: receiving, by an AP, from an LSC an access layer authentication parameter corresponding to a UE, where the access layer authentication parameter is transmitted by the LSC after the LSC determines that network layer mutual authentication with the UE is passed.

Operation 1402: performing, by the AP, access layer mutual authentication with the UE, and allowing the UE to access the AP after determining that the access layer mutual authentication with the UE is passed.

Optionally, performing, by the AP, access layer mutual authentication with the UE corresponding to the access layer authentication parameter, includes: transmitting, by the AP, an access layer authentication request message including both an APG identifier and the access layer authentication parameter to the UE, so that the UE authenticates a network according to the access layer authentication request message; and authenticating, by the AP, the UE according to an access layer authentication request response message if the AP receives from the UE the access layer authentication request response message including the APG identifier.

Optionally, authenticating, by the AP, the UE according to the access layer authentication request response message including the APG identifier and transmitted by the UE, includes: determining, by the AP, that the authentication of the UE is passed if an authentication response parameter included in the access layer authentication request response message and an expected response parameter in the access layer authentication parameter are the same.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for access control, comprising:
  performing, by a user equipment, network layer mutual authentication with a local service center when the user equipment needs to access a network; and
  performing, by the user equipment, access layer mutual authentication with an access point of a corresponding access points group after the network layer mutual authentication is passed, so that the user equipment accesses the access points group after the access layer mutual authentication is passed;
  wherein the access point of the corresponding access points group is determined by the local service center after the network layer mutual authentication is passed;
  wherein performing, by the user equipment, access layer mutual authentication with the access point of the corresponding access points group, comprises:
  authenticating, by the user equipment, a network according to an access layer authentication request message comprising an access points group identifier and an access layer authentication parameter and transmitted by a target access point in the access points group; and
  transmitting, by the user equipment, an access layer authentication request response message comprising the access points group identifier to the target access point after authentication of the network is passed, so that the target access point authenticates the user equipment according to the access layer authentication request response message;
  wherein authenticating, by the user equipment, the network according to the access layer authentication request message comprising the access points group identifier and transmitted by the target access point in the access points group, comprises:
  determining, by the user equipment, a second authentication token according to a random number in the access layer authentication request message; and
  determining, by the user equipment, that the authentication of the network is passed if the second authentication token and a first authentication token in the access layer authentication request message are same.

2. The method according to claim 1, wherein transmitting, by the user equipment, the access layer authentication request response message comprising the access points group identifier to the target access point after the authentication of the network is passed, comprises:
  determining, by the user equipment, an authentication response parameter according to the random number after the authentication of the network is passed; and
  transmitting, by the user equipment, the access layer authentication request response message comprising the access points group identifier and the authentication response parameter to the target access point, so that the target access point authenticates the user equipment according to the access points group identifier and the authentication response parameter.

3. A user equipment, comprising a memory and a processor, wherein the processor is configured to read a program in the memory to perform the method according to claim 1.

4. A method for access control, comprising:
  performing, by a local service center, network layer mutual authentication with a user equipment after receiving an access request message from the user equipment;
  determining, by the local service center, an access points group corresponding to the user equipment after determining that the network layer mutual authentication with the user equipment is passed; and
  instructing, by the local service center, an access point of the access points group to perform access layer mutual authentication with the user equipment, so that the access points group allows the user equipment to access the access points group after the access layer mutual authentication is passed;

wherein instructing, by the local service center, the access point of the access points group to perform access layer mutual authentication with the user equipment, comprises:

determining, by the local service center, a target access point in the access points group; and instructing, by the local service center, the target access point to perform access layer mutual authentication with the user equipment;

wherein instructing, by the local service center, the target access point to perform access layer mutual authentication with the user equipment, comprises:

transmitting, by the local service center, to the target access point an access points group identifier corresponding to the access points group and an access layer authentication parameter corresponding to the user equipment, so that the target access point performs access layer mutual authentication with the user equipment according to the access points group identifier and the access layer authentication parameter;

wherein authenticating, by the local service center, the user equipment according to the network layer authentication request response message transmitted by the user equipment, comprises:

determining, by the local service center, that authentication of the user equipment is passed if an authentication response parameter comprised in the network layer authentication request response message and an expected response parameter in the network layer authentication parameter are same.

5. The method according to claim 4, after receiving, by the local service center, the access request message from the user equipment and before performing, by the local service center, network layer mutual authentication with the user equipment, the method further comprising:

requesting, by the local service center, a network layer authentication parameter corresponding to the user equipment from a network service center, according to context information of the user equipment in the access request message;

wherein performing, by the local service center, network layer mutual authentication with the user equipment, comprises:

performing, by the local service center, network layer mutual authentication with the user equipment according to the network layer authentication parameter.

6. The method according to claim 5, wherein performing, by the local service center, network layer mutual authentication with the user equipment according to the network layer authentication parameter, comprises:

transmitting, by the local service center, a network layer authentication request message comprising the network layer authentication parameter to the user equipment, so that the user equipment authenticates a network according to the network layer authentication request message; and authenticating, by the local service center, the user equipment according to a network layer authentication request response message if the local service center receives the network layer authentication request response message transmitted by the user equipment.

7. The method according to claim 4, wherein the local service center determines the access layer authentication parameter corresponding to the user equipment by:

obtaining the access layer authentication parameter corresponding to the user equipment from a network service center; or determining the access layer authentication parameter corresponding to the user equipment, according to a network layer authentication parameter corresponding to the user equipment, and the access points group identifier.

8. A local service center, comprising a memory and a processor, wherein the processor is configured to read a program in the memory to perform the method according to claim 4.

9. A method for access control, comprising:

receiving, by an access point, from a local service center an access layer authentication parameter corresponding to a user equipment, wherein the access layer authentication parameter is transmitted by the local service center after the local service center determines that network layer mutual authentication with the user equipment is passed; and performing, by the access point, access layer mutual authentication with the user equipment, and allowing the user equipment to access the access point of a corresponding access points group after determining that the access layer mutual authentication with the user equipment is passed;

wherein performing, by the access point, access layer mutual authentication with the user equipment corresponding to the access layer authentication parameter, comprises:

transmitting, by the access point, an access layer authentication request message comprising an access points group identifier and the access layer authentication parameter to the user equipment, so that the user equipment authenticates a network according to the access layer authentication request message; and authenticating, by the access point, the user equipment according to an access layer authentication request response message if the access point receives from the user equipment the access layer authentication request response message comprising the access points group identifier;

wherein authenticating, by the access point, the user equipment according to the access layer authentication request response message comprising the access points group identifier and transmitted by the user equipment, comprises:

determining, by the access point, that authentication of the user equipment is passed if an authentication response parameter comprised in the access layer authentication request response message and an expected response parameter in the access layer authentication parameter are same.

10. An access point, comprising a memory and a processor, wherein the processor is configured to read a program in the memory to perform the method according to claim 9.

* * * * *